United States Patent
Miyawaki et al.

(10) Patent No.: US 9,257,687 B2
(45) Date of Patent: Feb. 9, 2016

(54) BATTERY ASSEMBLY

(75) Inventors: Yasutaka Miyawaki, Kyoto (JP); Yoshinori Ishimoto, Kyoto (JP); Atsushi Nishida, Kyoto (JP); Hirokazu Ito, Kyoto (JP)

(73) Assignee: GS YUASA INTERNATIONAL LTD, Kyoto-Shi, Kyoto (JP)

( * ) Notice: Subject to any disclaimer, the term of this patent is extended or adjusted under 35 U.S.C. 154(b) by 149 days.

(21) Appl. No.: 14/007,408

(22) PCT Filed: Mar. 23, 2012

(86) PCT No.: PCT/JP2012/057500
§ 371 (c)(1),
(2), (4) Date: Sep. 25, 2013

(87) PCT Pub. No.: WO2012/133179
PCT Pub. Date: Oct. 4, 2012

(65) Prior Publication Data
US 2014/0017540 A1  Jan. 16, 2014

(30) Foreign Application Priority Data

Mar. 28, 2011 (JP) ................. 2011-070550
Mar. 28, 2011 (JP) ................. 2011-070568

(51) Int. Cl.
*H01M 2/06* (2006.01)
*H01M 2/10* (2006.01)
*H01M 2/20* (2006.01)
*H01M 2/02* (2006.01)
*H01M 2/30* (2006.01)
*H01M 10/04* (2006.01)

(52) U.S. Cl.
CPC .......... *H01M 2/1011* (2013.01); *H01M 2/0245* (2013.01); *H01M 2/1016* (2013.01); *H01M 2/1077* (2013.01); *H01M 2/202* (2013.01); *H01M 2/305* (2013.01); *H01M 10/0413* (2013.01)

(58) Field of Classification Search
CPC . H01M 2/1016; H01M 2/1077; H01M 2/202; H01M 2/305; H01M 2/1011; H01M 2/0245; H01M 10/0413
See application file for complete search history.

(56) References Cited

U.S. PATENT DOCUMENTS

| | | | |
|---|---|---|---|
| 2008/0085447 A1* | 4/2008 | Kim et al. | 429/121 |
| 2009/0325043 A1 | 12/2009 | Yoon et al. | |
| 2010/0173189 A1 | 7/2010 | Suzuki | |
| 2011/0008667 A1* | 1/2011 | Kwag et al. | 429/123 |
| 2011/0151314 A1* | 6/2011 | Ogawa | 429/158 |
| 2012/0251855 A1 | 10/2012 | Miyawaki et al. | |
| 2012/0251873 A1 | 10/2012 | Miyawaki et al. | |
| 2013/0029192 A1 | 1/2013 | Oya | |

FOREIGN PATENT DOCUMENTS

| | | |
|---|---|---|
| CN | 101490871 A | 7/2009 |
| CN | 101771163 A | 7/2010 |
| JP | H08-264170 A | 10/1996 |

(Continued)

*Primary Examiner* — Muhammad Siddiquee
(74) *Attorney, Agent, or Firm* — McGinn IP Law Group, PLLC

(57) ABSTRACT

A battery assembly includes a plurality of electric cells each having an external terminal at one end thereof, a first cap attached to the one end of each of the electric cells and a first holder attached to the plurality of electric cells and is in contact with the first caps.

19 Claims, 18 Drawing Sheets

(56) References Cited

FOREIGN PATENT DOCUMENTS

| | | |
|---|---|---|
| JP | 2000-228177 A | 8/2000 |
| JP | 2001-307784 A | 11/2001 |
| JP | 2003-346745 A | 12/2003 |
| JP | 2008-226744 A | 9/2008 |
| JP | 2010-015760 A | 1/2010 |
| JP | 2010-049808 A | 3/2010 |
| JP | 2010-225552 A | 10/2010 |
| JP | 2010-282811 A | 12/2010 |
| JP | 2011-018640 A | 1/2011 |
| JP | 2011-134554 A | 7/2011 |
| JP | 2012-069337 A | 4/2012 |

* cited by examiner

BATTERY ASSEMBLY

TECHNICAL FIELD

The present invention relates to a battery assembly (battery module) in which a plurality of electric cells (battery cells) are electrically connected and modularized.

BACKGROUND ART

Patent Document 1 discloses a battery assembly configured such that a plurality of electric cells aligned in one row are sandwiched and fixed by a pair of side plates located at both ends in the alignment direction.

Patent Document 2 discloses a battery assembly configured such that a plurality of electric cells are aligned in a case having a box shape and open upper end and the opening of the case is closed by a cover.

In the configuration according to Patent Document 1, the number of the electric cells in the alignment direction can be increased and decreased by relatively easy redesign. Other than the above, change in arrangement of the electric cells requires significant redesign. In the configuration according to Patent Document 2, it is necessary to redesign both the case and the cover in order to change the arrangement of the electric cells. Each of the case and the cover is typically made of a resin. It is thus necessary to prepare new expensive molds for shaping the case and the cover due to such redesign. As described above, the battery assemblies according to Patent Documents 1 and 2 each have the low degree of freedom of the arrangement of the electric cells in view of the restriction in cost. It is thus difficult to achieve various kinds of small quantity production at a low cost.

Patent Document 3 discloses a battery assembly in which each of rectangular electric cells is provided at both sides thereof with protrusions and a through hole is provided at each of a pair of exterior plates laterally sandwiching the electric cells. Vibration proof and impact resistance are improved by fitting the protrusions to the through holes.

In order to assemble the battery assembly according to Patent Document 3, after the plurality of electric cells are aligned, the electric cells need to be laterally sandwiched by the pair of exterior plates in a state where the through holes are accurately positioned at the protrusions provided at the both sides of the electric cells. In this regard, the battery assembly according to Patent Document 3 requires complicated assembly work with less easiness.

PRIOR ART DOCUMENTS

Patent Documents

Patent Document 1: JP-A-2003-346745
Patent Document 2: JP-A-2010-15760
Patent Document 3: JP-A-08-264170

SUMMARY OF THE INVENTION

Problems to be Solved by the Invention

It is an object of the present invention to increase the degree of freedom of the arrangement of electric cells in a battery assembly.

Means for Solving the Problems

The present invention provides a battery assembly including: a plurality of electric cells each having an external terminal at one end thereof; a first cap attached to the one end of each of the electric cells; and a first holder attached to the plurality of electric cells and is in contact with the first caps.

The first holder is made in contact with the first caps, so that the plurality of electric cells can be positioned. Even in a case of changing the number of the electric cells constituting the battery assembly or changing the arrangement thereof, it is possible to position the electric cells only by making the first holder in contact with the first caps, thereby achieving the high degree of freedom of the arrangement of the electric cells.

The battery assembly preferably further includes: a second cap attached to another end located opposite to the one end of each of the electric cells; and a second holder attached to the plurality of electric cells and is in contact with the second caps; wherein the plurality of electric cells are sandwiched and held between the first holder and the second holder with the first caps and the second caps being interposed therebetween.

In this configuration, the battery assembly can be assembled only by placing the electric cells, to which the second caps are attached, on the second holder, attaching the first caps to the electric cells, and placing the first holder thereon. This configuration thus enables easy assembly.

There are provided the second caps in addition to the first caps so that the first and second caps sandwich and hold the plurality of electric cells. Even in a case of changing the number of the electric cells constituting the battery assembly or changing the arrangement thereof, there is no need to significantly change the shapes and sizes of the first and second holders as long as the first and second holders can sandwich the electric cells. This configuration thus achieves the high degree of freedom of the arrangement of the electric cells.

A plurality of the first caps can be attached to each of the electric cells.

The battery assembly preferably further includes: a first engaging portion formed at the first cap; and a first engaged portion, which is formed at the first holder, to be engaged with and disengaged from the first engaging portion.

When the first engaging portion is engaged with the first engaged portion, the first cap is securely held by the first holder, so that high vibration proofness and impact resistance are achieved.

The first engaging portion can be a projection and the first engaged portion can be a recess or a through hole with and from which the projection is engaged and disengaged.

The battery assembly preferably further includes: a second engaging portion formed at the second cap; and a second engaged portion, which is formed at the second holder, to be engaged with and disengaged from the second engaging portion.

The second engaging portion can be a projection and the second engaged portion can be a recess or a through hole with and from which the projection is engaged and disengaged.

The engaging portion can be a recess or a through hole, whereas the engaged portion can be a projection engaged with and disengaged from the recess or the through hole.

The projection is not specifically limited in terms of the shape, the size, and the number thereof, as long as the projection can be engaged with the recess or the through hole.

The projection is preferred to be gradually reduced in sectional area toward a tip thereof.

In this configuration, the projection can be smoothly fitted to the recess because the tapered portion is made in contact. It is thus possible to further increase the easiness of the assembly work.

There are preferably plural sets each set including the engaging portion formed at the first cap and the engaged portion formed at the first holder.

In this configuration, the cap can be held more securely while being positioned more reliably with respect to the holder.

Preferably, the electric cell has a substantially rectangular parallelepiped shape and has a top surface in a rectangular shape having a longitudinal direction and a short-length direction as viewed on a plane, end surfaces extending substantially orthogonally from short sides at both ends of the top surface in the longitudinal direction, and side surfaces extending substantially orthogonally from long sides at both ends of the top surface in the short-length direction, and the first cap includes a top wall in a rectangular shape as viewed on a plane and parallel to the top surface, a first end wall extending from the top wall along one of the end surfaces, a second end wall extending toward the top surface, and first and second side walls extending along the side surfaces.

The first cap can be provided with the first engaging portion at the top wall thereof.

The top wall of the first cap can be in contact with the first holder.

The first engaging portion of the first cap preferably has an inspecting through hole.

In this configuration, it is possible to insert a testing electrode or the like through the inspecting through hole so as to be made in contact with the external terminal of the electric cell. The engaging portion can be utilized for positioning the electric cell as well as for inspection.

Preferably, the electric cell has a substantially rectangular parallelepiped shape and has a top surface in a rectangular shape having a longitudinal direction and a short-length direction as viewed on a plane, end surfaces extending substantially orthogonally from short sides at both ends of the top surface in the longitudinal direction, and side surfaces extending substantially orthogonally from long sides at both ends of the top surface in the short-length direction, the second cap includes a bottom wall in a rectangular shape as viewed on a plane and side walls extending from four sides of the bottom wall along the end surfaces and the side surfaces of the electric cell, and the second cap is provided with the engaging portion at the bottom wall thereof.

The bottom wall of the second cap can be in contact with the second holder.

Advantages of the Invention

According to the present invention, in a case of changing the number of the electric cells constituting the battery assembly or changing the arrangement thereof, it is possible to position the electric cells only by making the first holder in contact with the first caps, thereby achieving the high degree of freedom of the arrangement of the electric cells and various kinds of small quantity production at a low cost.

MODES FOR CARRYING OUT THE INVENTION

Embodiments of the present invention are described in detail with reference to the drawings.

First Embodiment

FIGS. 1 to 4A each show a battery assembly (battery module) 1 according to the first embodiment of the present invention. The battery assembly 1 includes seven rectangular electric cells (battery cells) 2 that are non-aqueous electrolytic secondary batteries.

Figure 5:
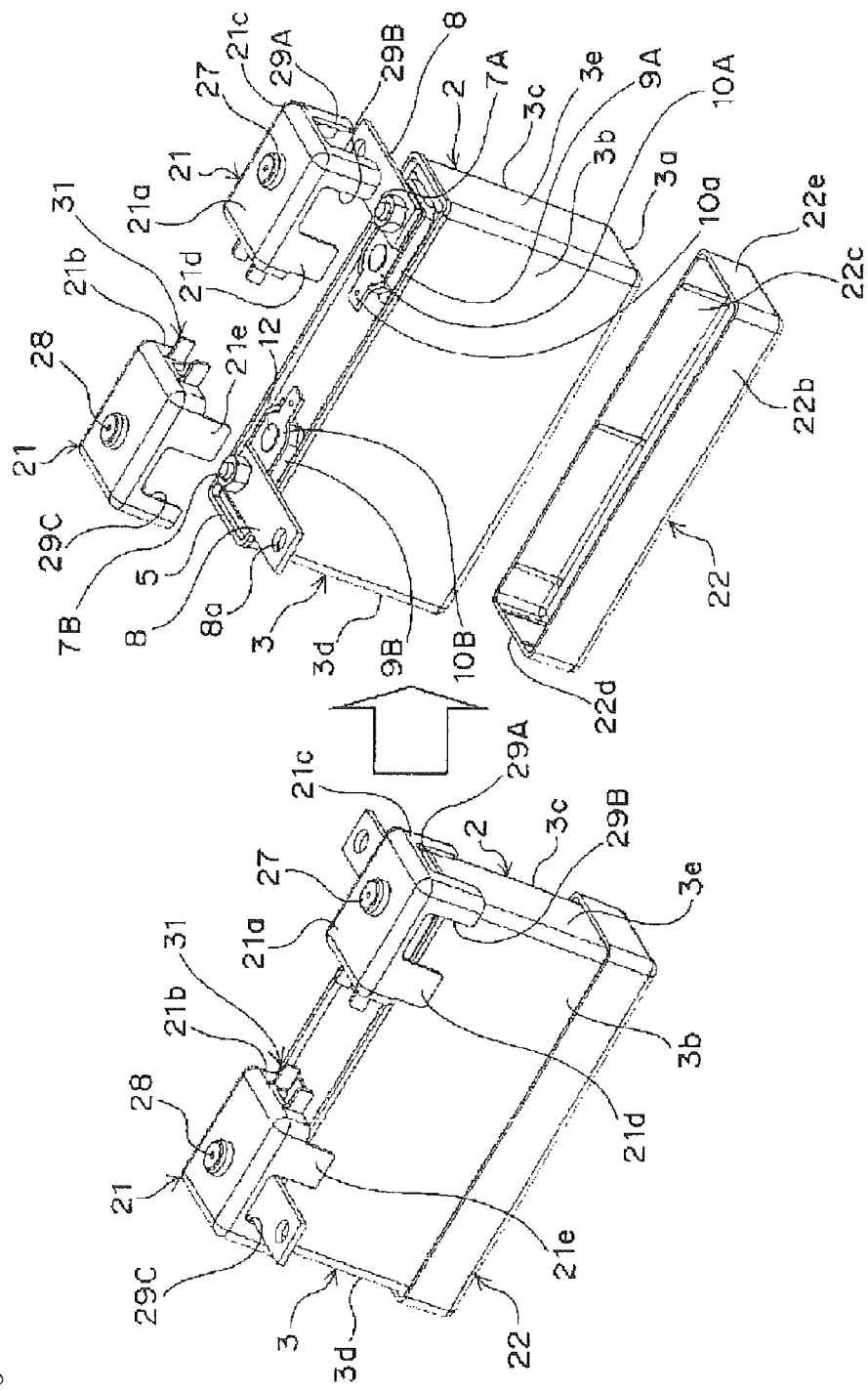
FIG. 5 is a perspective view of the electric cell, an upper cap, and a lower cap.
Figure 6:
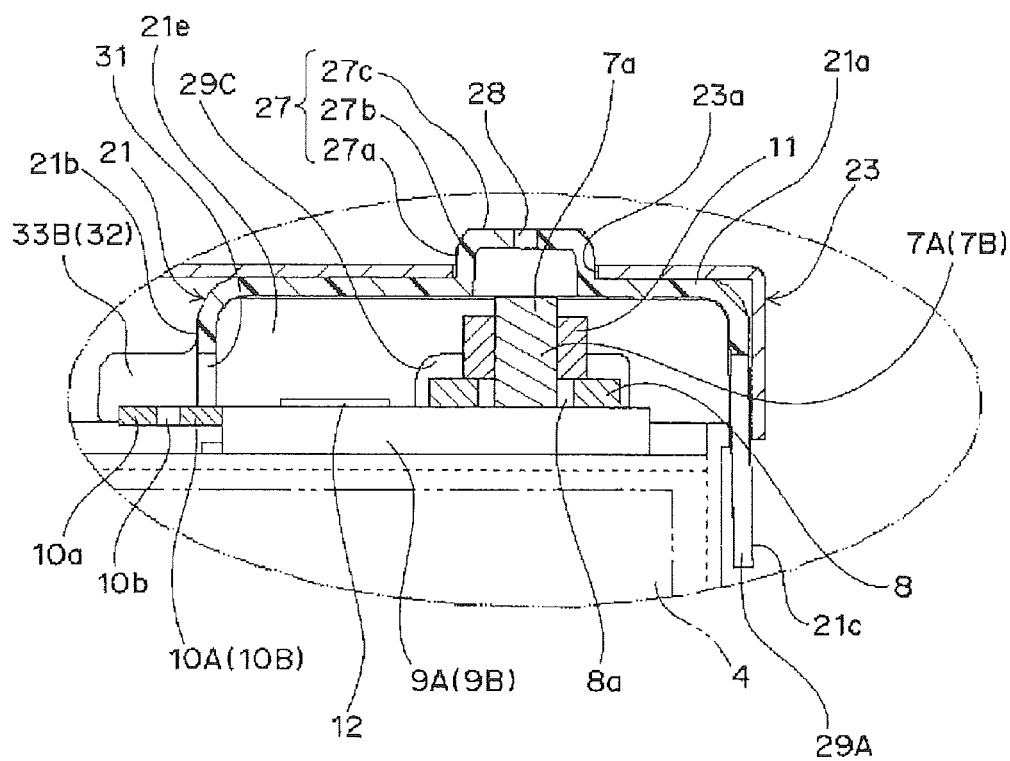
FIG. 6 is an enlarged sectional view of the upper cap attached to the electric cell.
Figure 7:
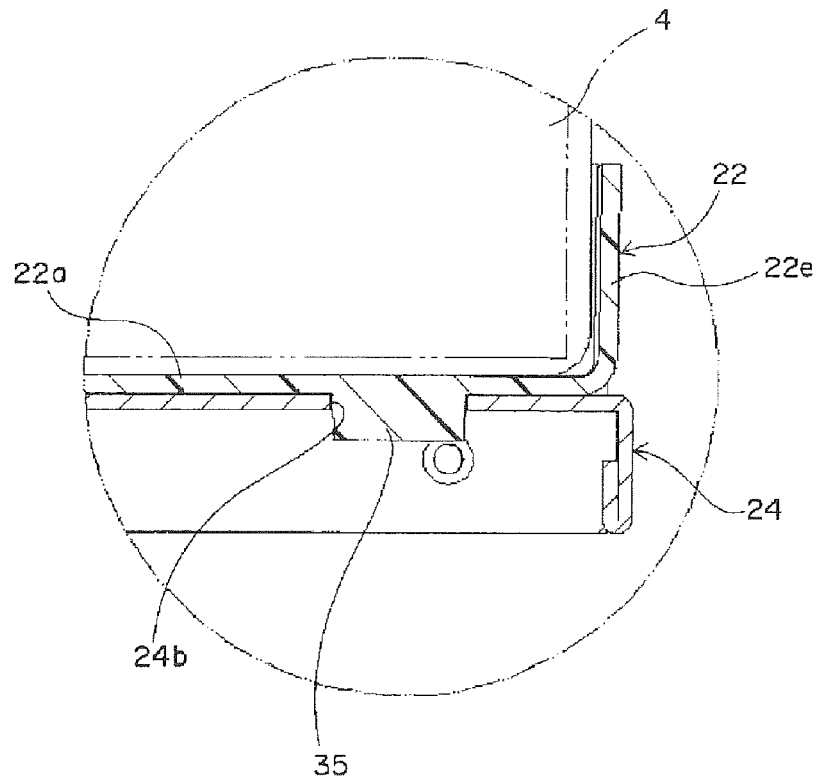
FIG. 7 is an enlarged sectional view of the lower cap attached to the electric cell.
Figure 8A:
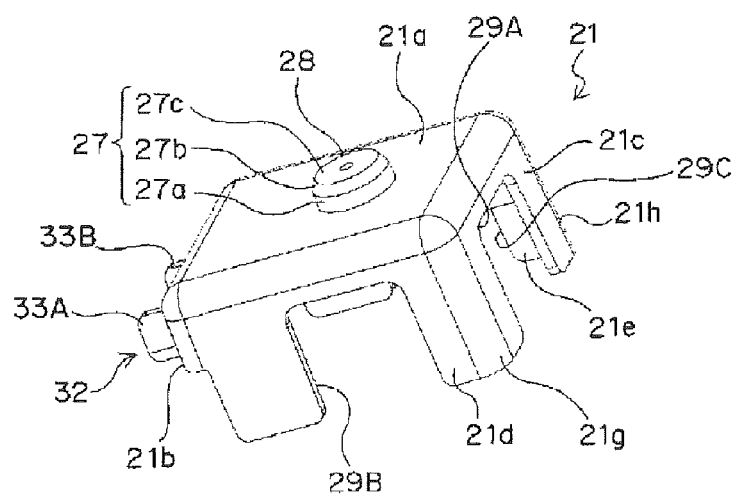
FIG. 8A is a perspective view of the upper cap, as viewed from above.
Figure 8B:
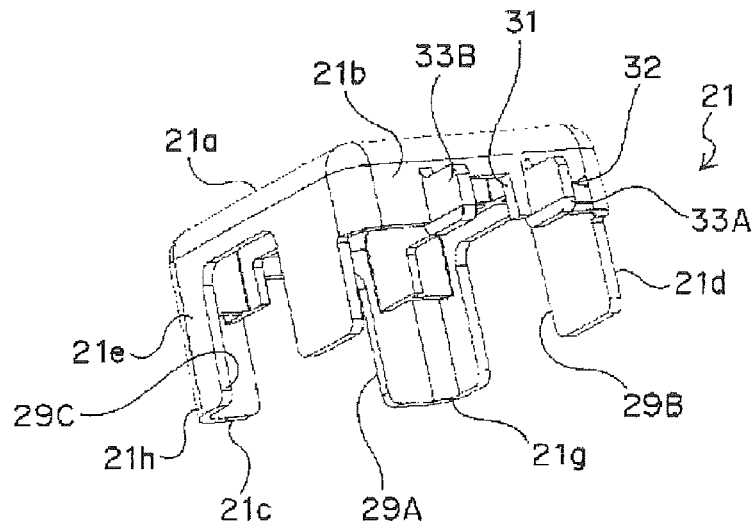
FIG. 8B is a perspective view of the upper cap, as viewed from above at an angle different from that of FIG. 8A.
Figure 8C:
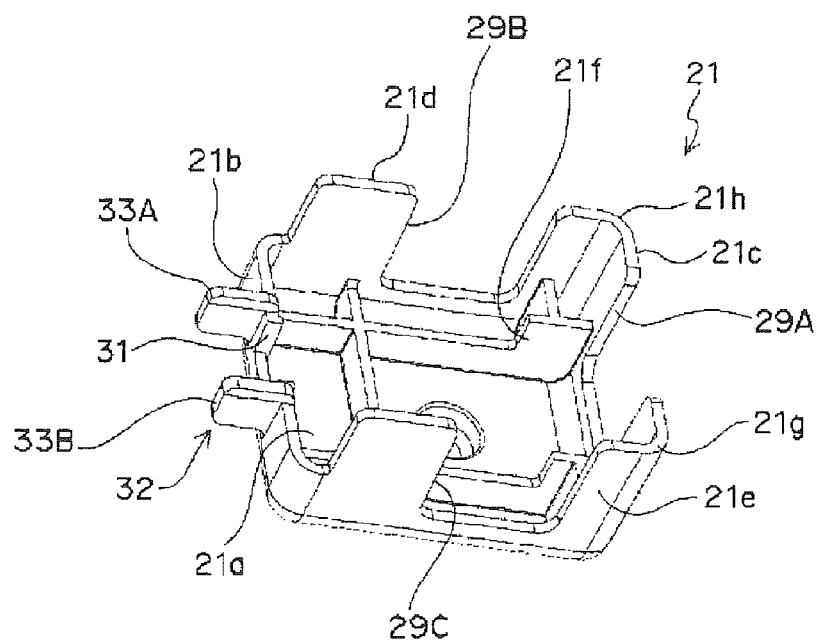
FIG. 8C is a perspective view of the upper cap, as viewed from below.
Figure 9A:
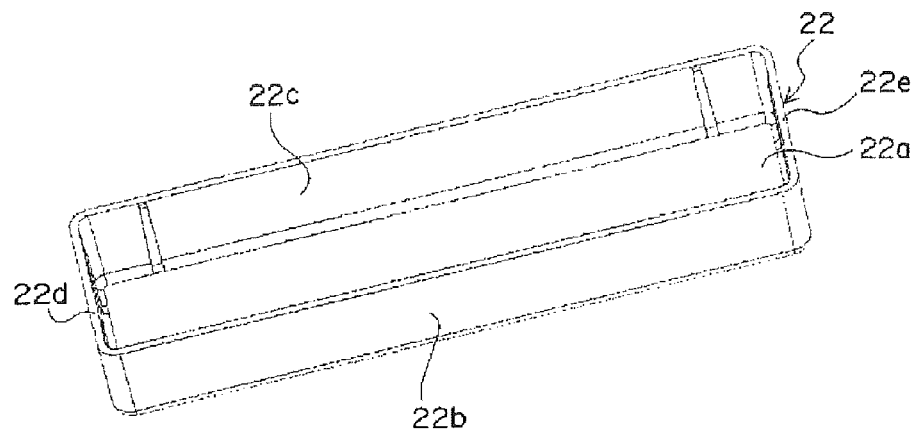
FIG. 9A is a perspective view of the lower cap, as viewed from above.
Figure 9B:
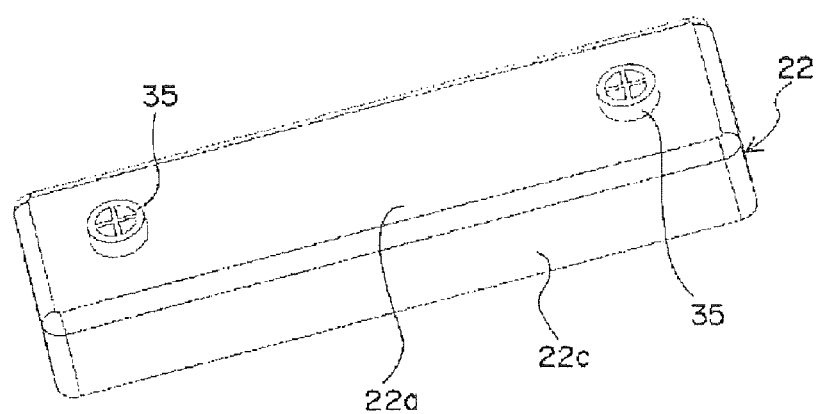
FIG. 9B is a perspective view of the lower cap, as viewed from below.
Figure 10:
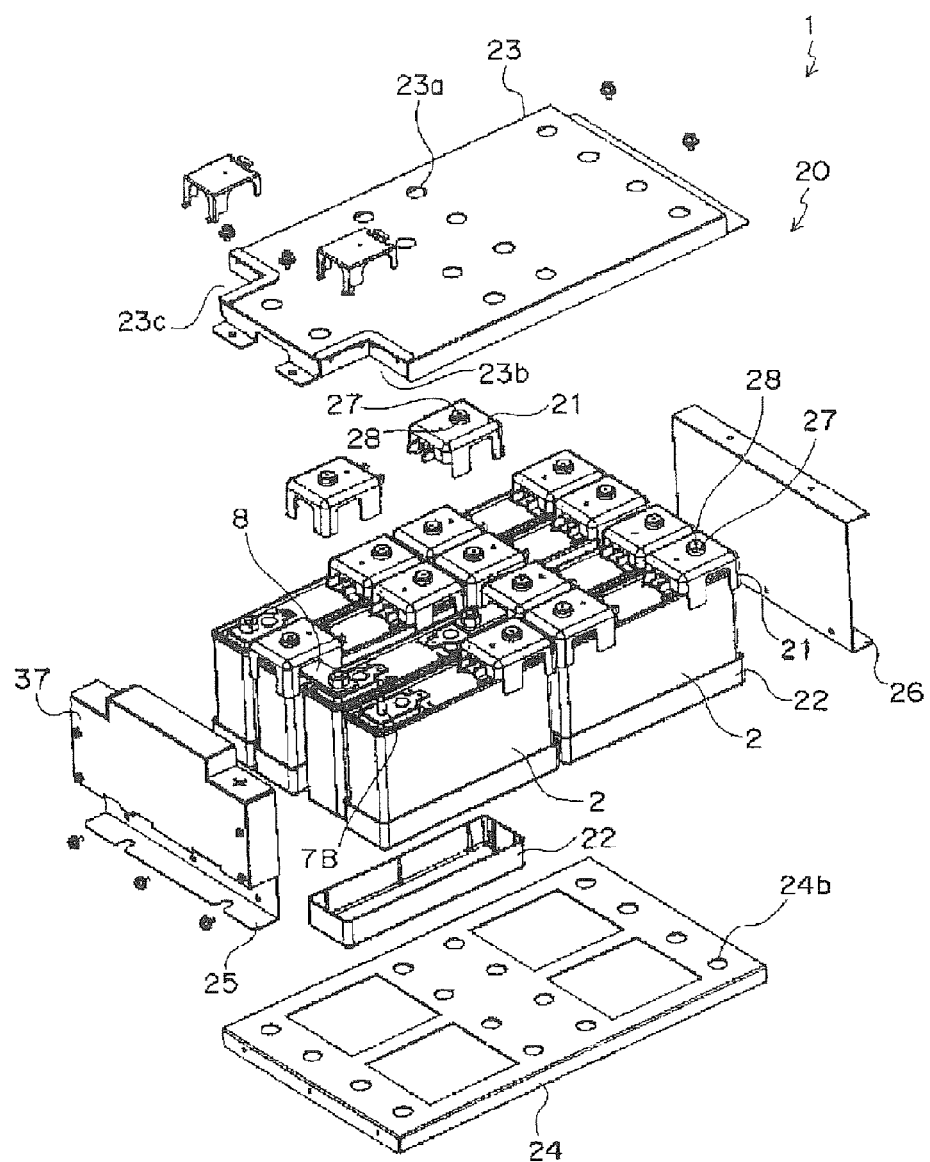
FIG. 10 is an exploded perspective view of a battery assembly according to a second embodiment of the present invention.
Figure 11:
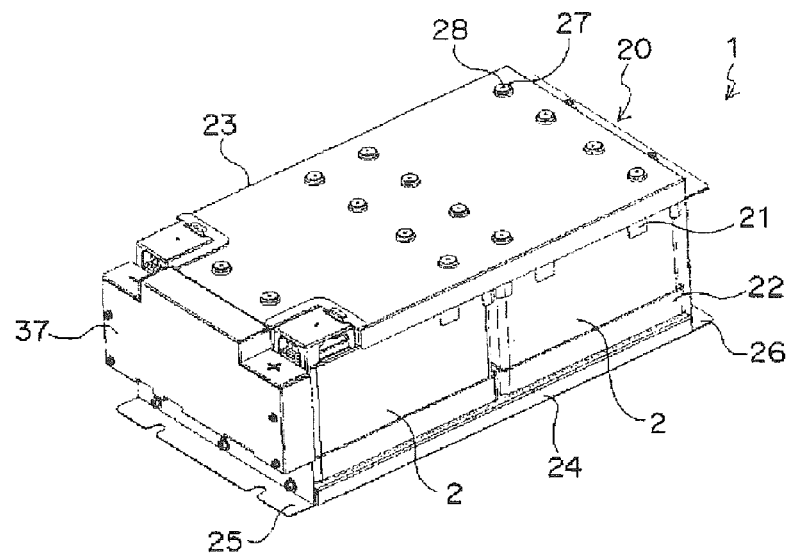
FIG. 11 is a perspective view of the battery assembly according to the second embodiment, as viewed from above.
Figure 12:
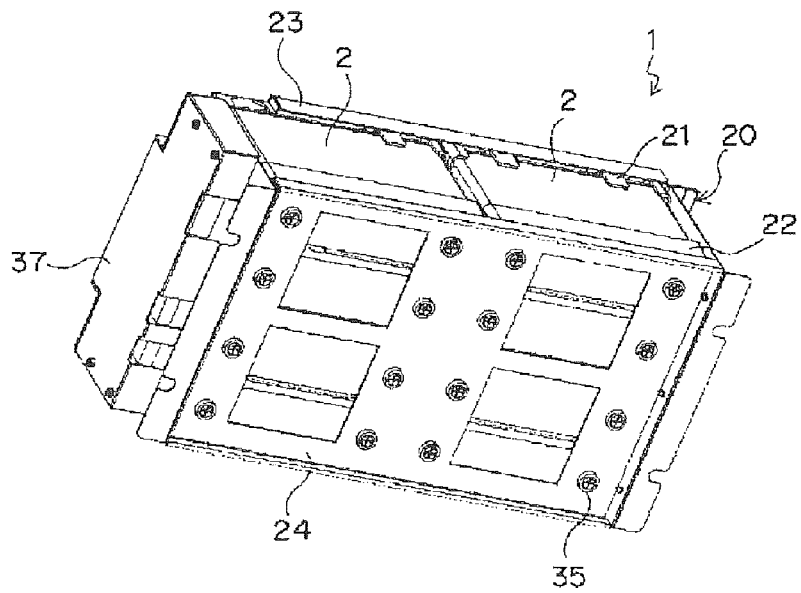
FIG. 12 is a perspective view of the battery assembly according to the second embodiment, as viewed from below.

Further referring to FIGS. 5 to 7, a power generating element 4 (schematically shown in FIGS. 6 and 7) is contained in a cell container 3 together with an electrolyte in each of the electric cells 2. An opening formed at the upper end of the cell container 3 is sealed with a cover 5.

The cell container 3 in the present embodiment is provided with side walls 3b to 3e extending upward from a rectangular bottom wall 3a. The side walls include a pair of long side walls 3b and 3c opposite to each other and a pair of short side walls 3d and 3e opposite to each other, each having a smaller area than those of the long side walls 3b and 3c. Out of four sides of a rectangle defined by the bottom wall 3a as the cell container 3 is viewed on a plane, the long side walls 3b and 3c extend from a pair of long sides whereas the short side walls 3d and 3e extend from a pair of short sides. The cover 5 also has a substantially rectangular shape. The cell container 3 and the cover 5 constitute a substantially flat exterior body in a rectangular parallelepiped shape. Positive and negative external terminals 7A and 7B are disposed near both ends of the cover 5 of the electric cell 2. Outer peripheries of the side walls 3b to 3e of the cell container 3 are covered with an insulating sheet (not shown).

Figure 4A:
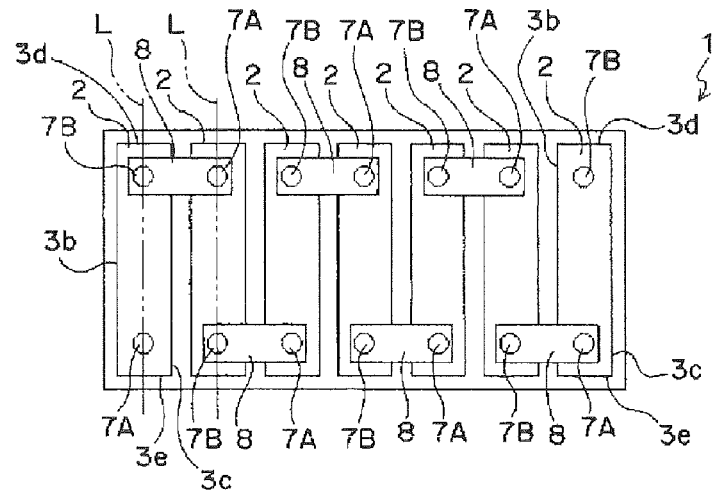
FIG. 4A is a schematic plan view of a connection path for electric cells in the battery assembly according to the first embodiment.
Figure 4B:
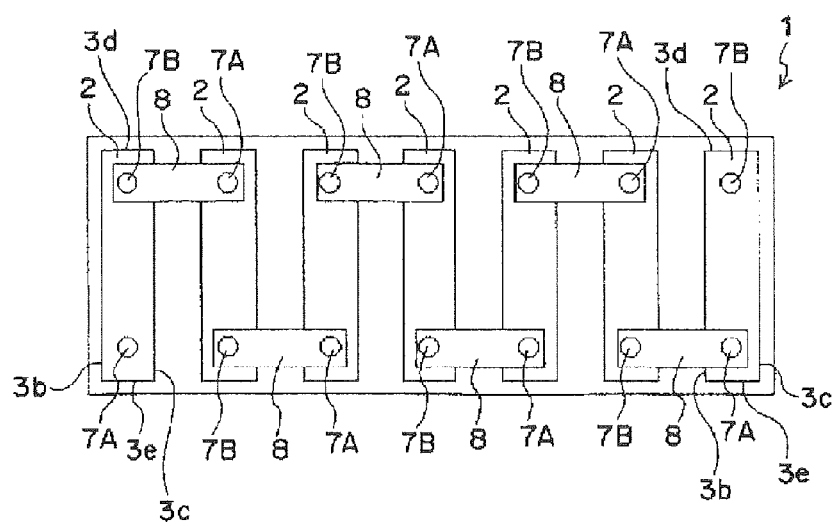
FIG. 4B is a schematic plan view of a connection path when the arrangement of the electric cells in the battery assembly according to the first embodiment is changed.

As is most clearly shown in FIG. 4A, the seven electric cells 2 constituting the battery assembly 1 are aligned in one row. More specifically, the seven electric cells 2 are aligned in one row such that longitudinal directions L of the cell containers 3 of the adjacent two electric cells 2 are substantially parallel to each other (parallel arrangement) as viewed from the cover 5 (where the external terminals 7A and 7B are provided). In other words, the seven electric cells 2 are aligned such that the long side wall 3b of one of the adjacent electric cells 2 faces the long side wall 3c of the other electric cell 2 with a clearance. The external terminals 7A and 7B in each of the electric cells 2 are electrically connected to the external terminals 7A and 7B in the other adjacent electric cell 2 via bus bars (conductive members) 8. The seven electric cells 2 are connected in series to each other. In FIG. 4A, the external terminal 7A of the leftmost electric cell 2 constitutes a positive electrode of the battery assembly 1 whereas the external terminal 7B of the rightmost electric cell 2 constitutes a negative electrode of the battery assembly 1.

As shown in FIGS. 5 and 6, heads (not shown) of the external terminals 7A and 7B and connecting rods 10A and 10B are contained in gaskets 9A and 9B attached to the upper surface of the cover 5. A shaft 7a of each of the external terminals 7A and 7B, provided with a male screw, projects upward from the head and penetrates the connecting rod 10A or 10B. The shaft 7a of each of the external terminals 7A and 7B is inserted into a through hole 8a formed at one end of a bus bar 8, and the one end of the bus bar 8 is fixed with a nut 11. Each of the connecting rods 10A and 10B is connected to a current collector (not shown) in the cell container 3 via a rivet 12, so that the current collector is connected to the power generating element 4.

Each of the connecting rods 10A and 10B includes a rectangular inspecting terminal 10a having a small width and disposed at one end thereof (an end opposite to each of the external terminals 7A and 7B). As is most clearly shown in FIG. 5, the inspecting terminals 10a laterally project from the gaskets 9A and 9B, to be thus positioned above the upper surface of the cover 5 with a clearance. A screw hole 10b used for screwing a screw (not shown) for connecting an electric wire is provided near the tip of the inspecting terminal 10a.

The battery assembly 1 includes a holding structure 20 for holding the seven electric cells 2 in the above-described arrangement. The holding structure 20 is provided with an upper cap (first cap) 21 and a lower cap (second cap) 22, which are attached to each of the electric cells 2. The upper cap 21 and the lower cap 22 are made of a resin in the present embodiment. Moreover, the holding structure 20 is provided with an upper holder (first holder) 23 and a lower holder (second holder) 24, which sandwich and hold the electric cells 2 provided with the upper cap 21 and the lower cap 22 in a vertical direction in the figures. The holding structure 20 is further provided with a pair of side parts 25 and 26 which connect the upper holder 23 and the lower holder 24 to each other. A monitor 37 is attached to one of the side part 25.

The upper cap 21 is described with reference to FIGS. 5, 6, and 8A to 8C. The two upper caps 21 are attached to the upper end of the electric cell 2 so as to cover the pair of external terminals 7A and 7B, respectively. The upper caps 21 each include a rectangular top wall 21a, a front wall 21b and a rear wall 21c extending from front and rear sides of the top wall 21a, and side walls 21d and 21e extending from left and right sides of the top wall 21a. The top wall 21a is provided at the lower surface with a rib structure 21f.

The lower end of the front wall 21b and the lower end of the rib structure 21f near the rear wall 21c are placed at the upper end of the cell container 3, so that the upper cap 21 is held while being attached to the electric cell 2. The upper cap 21 attached to the electric cell 2 surrounds the external terminal 7A or 7B and its surroundings. More specifically, when the upper cap 21 is attached to the electric cell 2, the top wall 21a of the upper cap 21 is positioned above the external terminal 7A or 7B, the upper gasket 9A or 9B, and the connecting rod 10A or 10B. The rear wall 21c extends along the upper end (near the cover 5) of the short side wall 3d or 3e of the cell container 3. Furthermore, the side walls 21d and 21e extend along the upper ends (near the cover 5) of the pair of long side walls 3b and 3c of the cell container 3, respectively. Moreover, corners 21g and 21h defined by the rear wall 21c and the side walls 21d and 21e extend along corners defined by the short side walls 3d and 3e and the long side walls 3b and 3c in the cell container 3.

One upper projection (first projection) 27 is formed at the upper surface (outer surface) of the top wall 21a of the upper cap 21. The upper projection 27 in the present embodiment has a substantially flat columnar shape as a whole. More specifically, the upper projection 27 in the present embodiment includes a columnar portion 27a projecting from the upper surface of the top wall 21a and having a predetermined diameter, and a tapered portion 27b gradually reduced in diameter toward the foremost tip formed at the tip (upper end) of the columnar portion 27a. Moreover, the upper projection 27 has a tip surface 27c that is substantially flat.

As is most clearly shown in FIG. 6, the external terminal 7A or 7B is located immediately below the upper projection 27. There is formed an inspecting through hole 28 that penetrates from the tip surface 27c of the upper projection 27 to the lower surface of the top wall 21a of the upper cap 21. In other words, the inspecting through hole 28 reaches the external terminal 7A or 7B surrounded with the upper cap 21 from outside the upper cap 21.

Bus bar openings 29A, 29B, and 29C are provided at the rear wall 21c and the side walls 21d and 21e of the upper cap 21, respectively, so as to penetrate in the thickness direction. The bus bar openings 29A to 29C are provided so that the bus bar 8 connected to the external terminal 7A or 7B is inserted thereinto and projects from the upper cap 21. In, for example, FIG. 5, the bus bar 8 connected at one end to the external terminal 7A or 7B is inserted into the bus bar opening 29B of the upper cap 21 and projects from the upper cap 21 to extend toward the external terminal (not shown in FIG. 5) of the other electric cell. In the present embodiment, the bus bar opening 29A is a cutout extending from the lower end of the rear wall 21c toward the top wall 21a whereas the bus bar openings 29B and 29C are cutouts extending from the lower ends of the side walls 21d and 21e toward the top wall 21a. Alternatively, as long as the bus bar 8 can be inserted, the bus bar openings 29A to 29C can be through holes penetrating the rear wall 21c and the side walls 21d and 21e in the thickness direction.

The front wall 21b of the upper cap 21 is provided with a terminal opening 31 that penetrates in the thickness direction and allows the inspecting terminal 10a of the connecting rod 10A or 10B to be inserted thereinto. Most of the connecting rod 10A or 10B is contained in the upper gasket 9A or 9B. On the other hand, the inspecting terminal 10a as part of the connecting rod 10A or 10B projects outward from the upper gasket 9 through the terminal opening 31. In the present embodiment, the terminal opening 31 is a cutout extending from the lower end of the front wall 21b toward the top wall 21a. Alternatively, as long as the inspecting terminal 10a can be inserted, the terminal opening 31 can be a through hole penetrating the front wall 21b in the thickness direction.

In order to protect the inspecting terminal 10a projecting outward from the upper cap 21 through the terminal opening 31, the front wall 21b of the upper cap 21 is provided with a protector 32. The protector 32 in the present embodiment is provided with a pair of plate-like ribs 33A and 33B extending from both sides of the terminal opening 31 at the front wall 21b along both side parts of the inspecting terminal 10a. Referring to FIG. 5, the upper end of each of the ribs 33A and 33B is located above the inspecting terminal 10a (at a position apart from the cover 5 of the electric cell 2).

The lower cap 22 is described with reference to FIGS. 5, 7, 9A, and 9B. The lower cap 22 has an elongated box shape and has an open upper end, and is attached to the lower end of the cell container 3 of the electric cell 2. More specifically, the lower cap 22 is provided with a substantially rectangular bottom wall 22a and side walls 22b, 22c, 22d, end 22e extending from the four sides of the bottom wall 22a. When the lower cap 22 is attached to the lower end of the electric cell 2, the bottom wall 3a of the cell container 3 is placed on the bottom wall 22a, the side walls 22b and 22c extend along the long side walls 3b and 3c of the cell container 3, respectively, and the side walls 22d and 22e extend along the short side walls 3d and 3e of the cell container 3, respectively.

The lower surface (outer surface) of the bottom wall 22a of the lower cap 22 is provided with a pair of lower projections 35 and 35. The lower projection 35 in the present embodiment has a substantially flat columnar shape as a whole.

Figure 1:
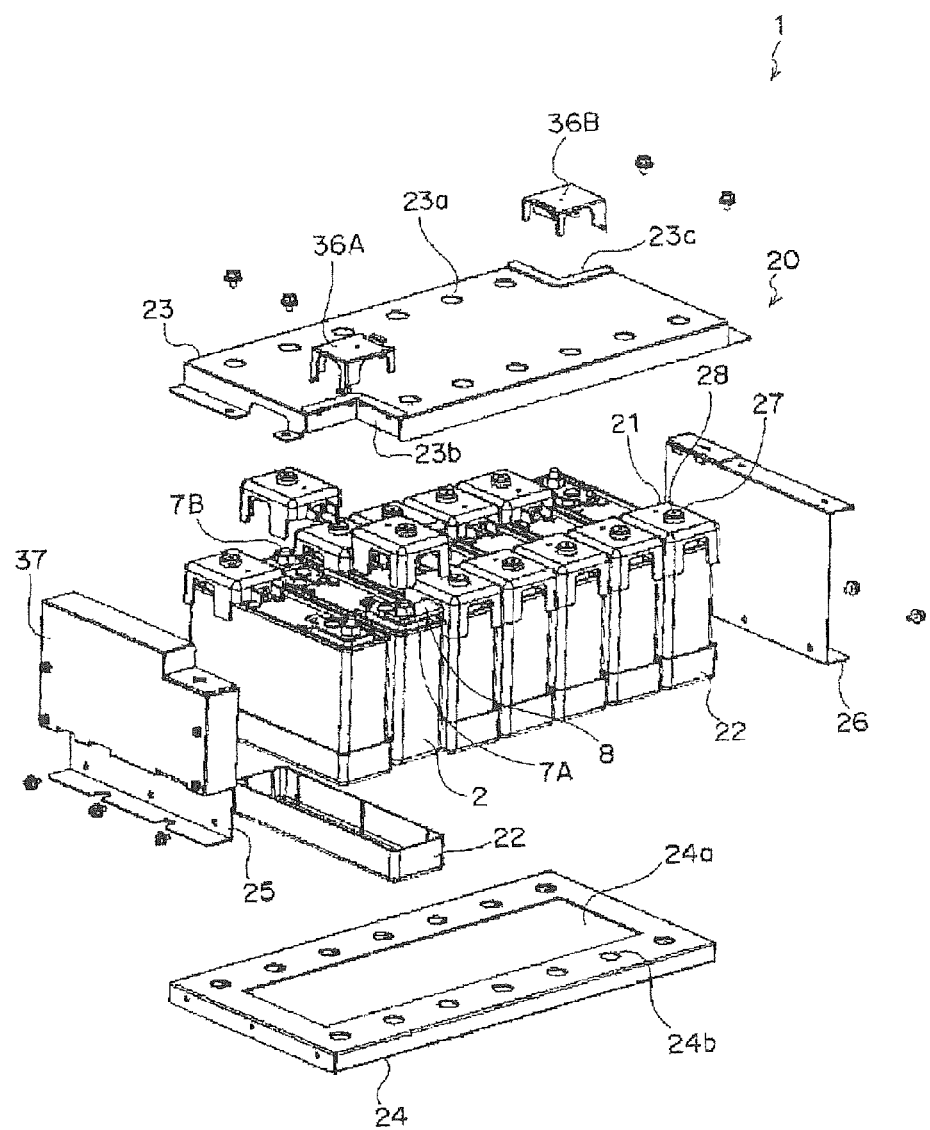
FIG. 1 is an exploded perspective view of a battery assembly according to a first embodiment of the present invention.
Figure 2:
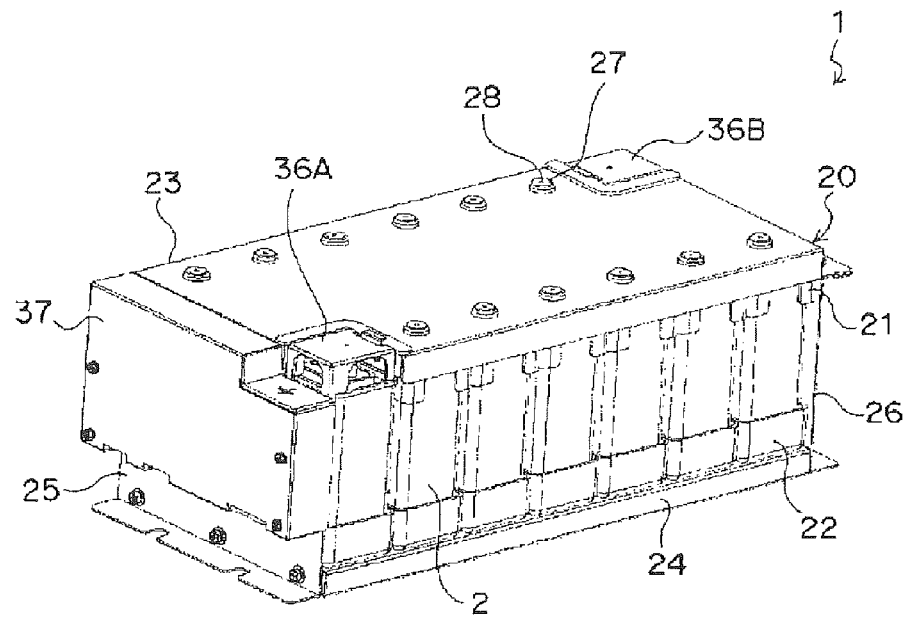
FIG. 2 is a perspective view of the battery assembly according to the first embodiment, as viewed from above.

The upper holder 23 in the present embodiment has an integral structure shaped by pressing a metallic plate into a rectangular shape, for example. A circular upper through hole (first recess) 23a, to which the upper projection 27 of the upper cap 21 is fitted, is formed so as to penetrate in the thickness direction. Referring to FIGS. 1 and 2, the pair of upper caps 21 are attached to each of the five electric cells 2 except the rightmost and leftmost electric cells 2 out of the seven electric cells 2 in the figures. One upper cap 21 is attached to each of the leftmost electric cell 2 in the figures, in which the external terminal 7A functions as the positive electrode of the battery assembly 1, and the rightmost electric cell 2 in the figures, in which the external terminal 7B functions as the negative electrode of the battery assembly 1. In other words, the battery assembly 1 according to the present embodiment includes the twelve upper caps 21 in total, and each of the upper caps 21 has one upper projection 27, as described above. The upper holder 23 is provided with twelve upper through holes 23a in total at the positions corresponding to the upper projections 27 of the upper cap 21.

The upper holder 23 is provided with notched module openings 23b and 23c for exposing the external terminals 7A and 7B at a corner corresponding to the external terminal 7A (the positive electrode of the battery assembly 1) of the leftmost electric cell 2 and a corner corresponding to the external terminal 7B (the negative electrode of the battery assembly 1) of the rightmost electric cell 2 in FIGS. 1 and 2. Terminal protecting covers 36A and 36B are detachably attached to the module openings 23b and 23c, respectively.

Figure 3:
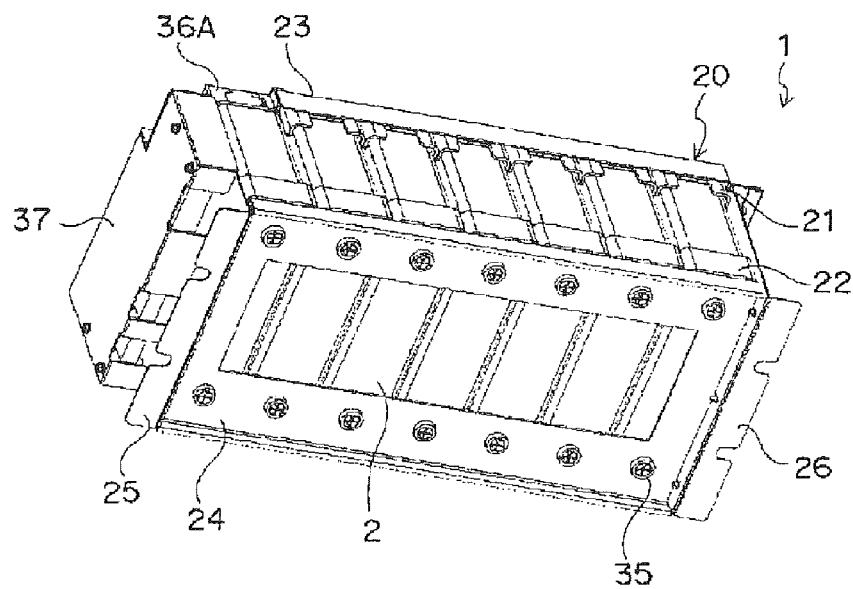
FIG. 3 is a perspective view of the battery assembly according to the first embodiment, as viewed from below.

The lower holder 24 in the present embodiment has a substantially integral structure shaped by pressing a metallic plate, for example. The lower holder 24 is provided at the center with a ventilation opening 24a that has a substantially rectangular contour and a large area, and therefore, exhibits a rectangular frame shape as a whole. The lower holder 24 is provided with circular lower through holes (second recesses) 24b, to which the lower projections 35 of the lower caps 22 are fitted, so as to penetrate in the thickness direction. Referring to FIGS. 1 to 3, the lower caps 22 are mounted to all of the seven electric cells 2. Each of the lower caps 22 is provided with the two lower projections 35 as described above. The lower holder 24 is thus provided with the fourteen lower through holes 24b in total at the positions corresponding to the lower projections 35, respectively.

Referring to FIGS. 1 to 3, in the upper cap 21 mounted to the upper end of the electric cell 2, the upper projection 27 is fitted to the upper through hole 23a and the top wall 21a abuts against the lower surface of the upper holder 23. In contrast, in the lower cap 22 mounted to the lower end of the electric cell 2, the lower projection 35 is fitted to the lower through hole 24b and the bottom wall 22a abuts against the upper surface of the lower holder 24. The upper holder 23 and the lower holder 24 are connected to each other by the side parts 25 and 26 while sandwiching and holding the seven electric cells 2 with the upper caps 21 and the lower caps 22 being interposed therebetween. The side part 25, to which the monitor 37 is attached, is disposed adjacently to the leftmost electric cell 2 in the figures whereas the side part 26 is disposed adjacently to the rightmost electric cell 2 in the figures. Each of the side parts 25 and 26 in the present embodiment has a substantially integral structure shaped by pressing a metallic plate into a rectangular shape, for example. In the present embodiment, the upper and lower ends of the side parts 25 and 26 are connected to the upper holder 23 and the lower holder 24 with screws, respectively. The upper projections 27 of the upper caps 21 are fitted to the upper through holes 23a of the upper holder 23, and the lower projections 35 of the lower caps 22 are fitted to the lower through holes 24b of the lower holder 24. This improves connection strength of the electric cells 2 to the upper holder 23 and the lower holder 24, as well as vibration proofness and impact resistance.

In the present embodiment, as shown in FIG. 4A, the seven electric cells 2 are aligned such that the longitudinal directions L of the adjacent electric cells 2 are substantially parallel to each other (parallel arrangement). Described below is a case of changing the arrangement shown in FIG. 4A to the arrangement (FIG. 4B) such that the clearances between the adjacent electric cells 2 are equally enlarged. In order to change the arrangement of the electric cells 2 in this manner, it is necessary to change the positions of the upper through holes 23a of the upper holder 23 and positions of the lower through holes 24b of the lower holder 24. In other words, in order to correspond to the enlarged clearances between the electric cells 2, it is necessary to enlarge the clearances between the adjacent upper through holes 23a and the clearances between the adjacent lower through holes 24b in the horizontal direction in FIG. 1. Meanwhile, there is no need to change the shapes of the upper cap 21 and the lower cap 22 attached to each of the electric cells 2. New mold need to be prepared in order to change the shapes of the upper caps 21 and the lower caps 22 made of a resin, while there is no need to prepare new molds for the upper holder 23 and the lower holder 24 due to changes of the clearances between the upper through holes 23a or the lower through holes 24b, because the upper holder 23 and the lower holder 24 are shaped by pressing a metallic plate, for example.

Figure 4C:
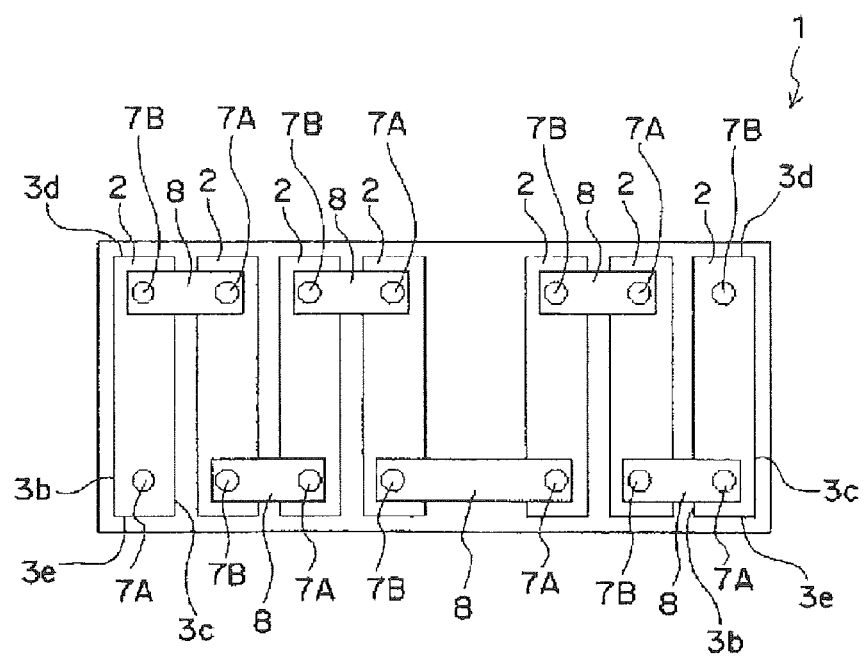
FIG. 4C is a schematic plan view of a connection path when the arrangement of the electric cells in the battery assembly according to the first embodiment is changed.

Also in a case of changing the arrangement shown in FIG. 4A to the arrangement shown in FIG. 4C such that only the clearance between the fourth and fifth electric cells 2 from the left end is enlarged, it has only to change the positions of the upper through holes 23a of the upper holder 23 and the positions of the lower through holes 24b of the lower holder 24. In this case, there is no need to change the shapes of the upper caps 21 and the lower caps 22.

In a case of increasing or decreasing the number of the electric cells 2 in the battery assembly 1 according to the first embodiment, it has only to increase or decrease the upper through holes 23a of the upper holder 23 and the lower through holes 24b of the lower holder 24 and change the positions thereof according thereto. In this case, there is no need to change the shapes of the upper caps 21 and the lower caps 22.

The battery assembly 1 according to the present embodiment has particular features to be described below.

Each of the upper caps 21 mounted to the upper end of the electric cell 2 provided with the external terminal 7A or 7B is securely held while being positioned with respect to the upper holder 23 due to fitting between the upper projection 27 and the upper through hole 23a. In particular, the upper caps 21 are more securely held while being more reliably positioned with respect to the upper holder 23 because there are provided the plural pairs of the upper projections 27 and the upper through holes 23a. Similarly, each of the lower caps 22 mounted to the lower end of the electric cell 2 is securely held while being positioned with respect to the lower holder 24 due to fitting between the lower projections 35 and the lower through holes 24b. In particular, the lower caps 22 are more securely held while being more reliably positioned with respect to the lower holder 24 because there are provided the plural pairs of the lower projections 35 and the lower through holes 24b. The battery assembly 1 thus achieves high vibration proofness and impact resistance.

While the upper projections 27 of the upper cap 21 are fitted to the upper through holes 23a of the upper holder 23, each of the lower caps 22 may not be provided with the lower projection 35 but the bottom wall 22a of the lower cap 22 can be alternatively placed on the lower holder 24. The upper caps 21 are securely held while being positioned with respect to the upper holder 23, thereby to improve vibration proofness and impact resistance.

The battery assembly 1 can be assembled such that the electric cells 2, to which the lower caps 22 are already attached, are aligned on the lower holder 24, the upper caps 21 are attached to the electric cells 2, and then the upper holder 23 is placed thereon. In this case, the assembly work is easily performed.

The tapered portion 27b is provided at the tip of each of the upper projections 27. It is thus possible to smoothly fit the upper projections 27 to the upper through holes 23a upon placing the upper holder 23 on the upper caps 21 attached to the electric cells 2, as described above. More specifically, even when the upper projections 27 are misaligned with the upper through holes 23a, the upper holder 23 can be descended toward the electric cells 2 and then edges of the upper through holes 23a can be guided by the tapered portions 27b. In this manner, the upper projections 27 can be fitted to the upper through holes 23a smoothly and reliably.

The upper cap 21 is attached to the upper end of the electric cell 2 so as to cover the external terminal 7A or 7B. There is provided, however, the inspecting through hole 28 that penetrates the upper cap 21 at the upper projection 27 and reaches the external terminal 7A or 7B. The upper projection 27 penetrates the upper through hole 23a of the upper holder 23 and projects outward. It is accordingly possible to inspect voltage or the like of each of the electric cells 2 with no need to detach the upper holder 23. In other words, without detaching the upper holder 23 from the battery assembly 1, it is possible to insert a testing electrode or the like into the inspecting through hole 28 so as to come into contact with the external terminal 7A or 7B for inspection.

Second Embodiment

Figure 13A:
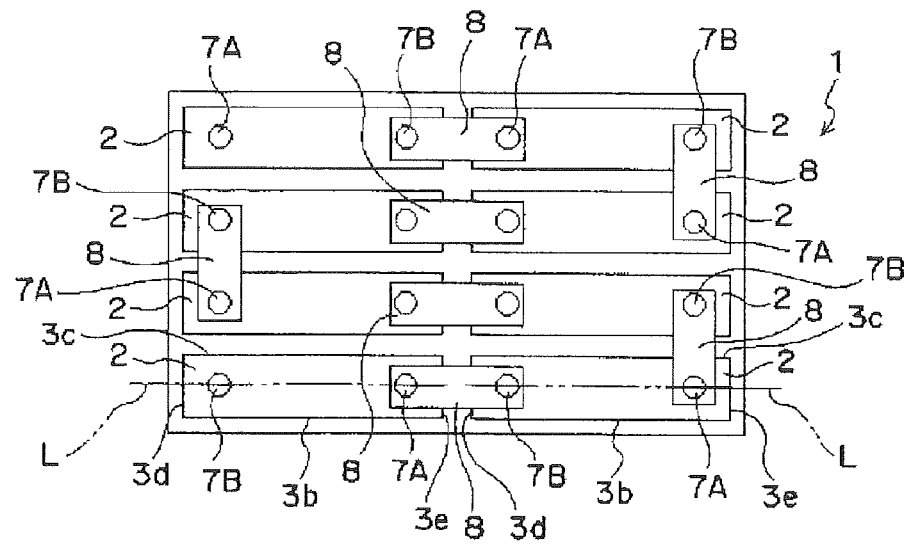
FIG. 13A is a schematic plan view of a connection path for electric cells in the battery assembly according to the second embodiment.

FIGS. 10 to 13A each show a battery assembly 1 according to the second embodiment of the present invention. The battery assembly 1 includes eight rectangular electric cells 2 same as those of the first embodiment. More specifically, the electric cells 2 are aligned in two rows such that the four electric cells 2 are aligned in each of the rows. As shown in FIG. 13A, the eight electric cells 2 are connected in series to each other from the lower left electric cell 2 to the upper left electric cell 2 such that the external terminal 7A or 7B of each of the electric cells 2 is connected to the external terminal 7A or 7B of the other adjacent electric cell 2 in the same or different row by the bus bar 8.

The arrangement of the eight electric cells 2 are described more specifically. The four electric cells 2 are aligned in each of the rows in the parallel arrangement (such that the longitudinal directions L of the cell containers 3 of the adjacent two electric cells 2 are substantially parallel to each other). When viewed from the cover 5 (where the external terminals 7A and 7B are provided), the adjacent two electric cells 2 belonging to the different rows (the adjacent two electric cells 2 in the horizontal direction in FIG. 13A) are aligned such that the longitudinal directions L of the cell containers 3 are substantially linear to each other (linear arrangement).

Figure 13B:
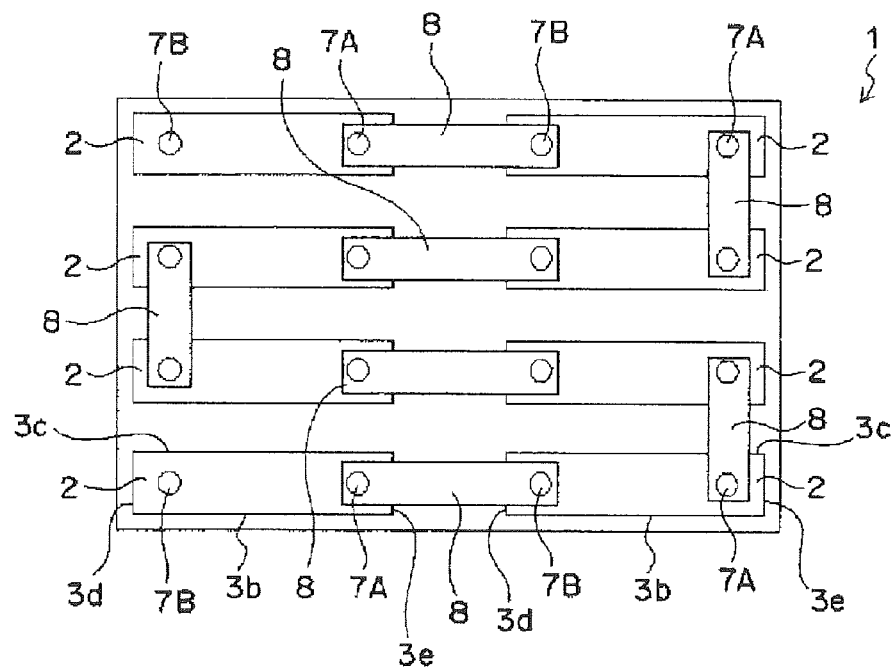
FIG. 13B is a schematic plan view of a connection path when the arrangement of the electric cells in the battery assembly according to the second embodiment is changed.

In a case of changing the arrangement shown in FIG. 13A to the arrangement shown in FIG. 13B such that the clearances between the adjacent electric cells 2 are equally enlarged, it is necessary to change the positions of the upper through holes 23a of the upper holder 23 and the positions of the lower through holes 24b of the lower holder 24. In other words, it is necessary to enlarge the clearances in the vertical and horizontal directions between the upper through holes 23a of the upper holder 23 and the lower through holes 24b of the lower holder 24 so as to correspond to the clearances enlarged in the vertical and horizontal directions between the electric cells 2. Meanwhile, there is no need to change the shapes of the upper cap 21 and the lower cap 22 attached to each of the electric cells 2.

Figure 13C:
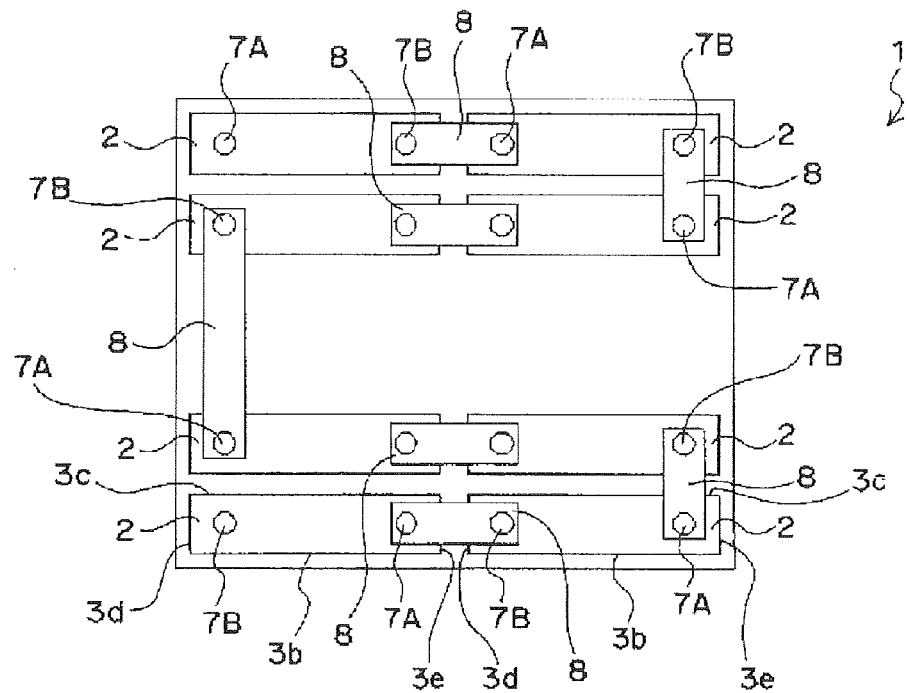
FIG. 13C is a schematic plan view of a connection path when the arrangement of the electric cells in the battery assembly according to the second embodiment is changed.

Also in a case of changing the arrangement shown in FIG. 13A to the arrangement shown in FIG. 13C such that the clearance between the second and third electric cells 2 from the top in the figures is enlarged in each of the rows, it has only to change the positions of the upper through holes 23a of the upper holder 23 and the positions of the lower through holes 24b of the lower holder 24. In this case, there is no need to change the shapes of the upper caps 21 and the lower caps 22.

The other configurations and the functions in the second embodiment are similar to those of the first embodiment. The same components are thus denoted by the same reference signs and are not described repeatedly.

Third Embodiment

Figure 14:
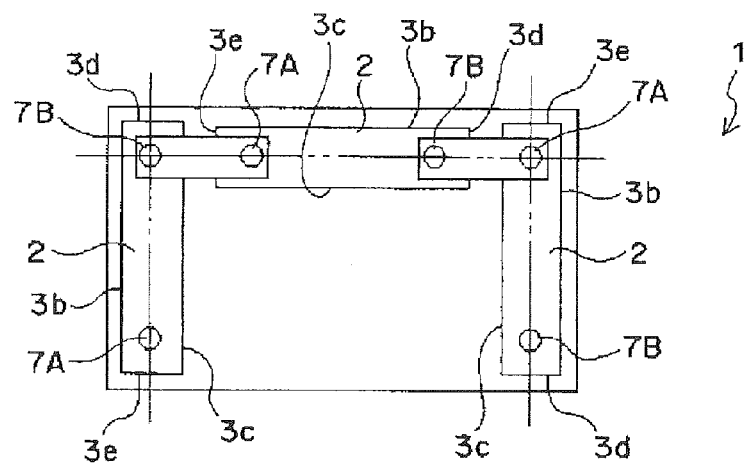
FIG. 14 is a schematic plan view of a battery assembly according to a third embodiment of the present invention.

FIG. 14 shows a battery assembly 1 according to the third embodiment of the present invention. The battery assembly 1 includes three rectangular electric cells 2 same as those of the first embodiment. The other structures not shown in FIG. 14 in the battery assembly 1 according to the present embodiment are similar to those of the first embodiment. Out of the three electric cells 2, the center electric cell 2 and the left electric cell 2 in the figure are aligned such that the longitudinal directions L of the cell containers 3 cross each other (substantially orthogonal in this example) (cross arrangement) as viewed from the cover 5. The center electric cell 2 and the right electric cell 2 are also aligned in the cross arrangement.

The other configurations and the functions in the third embodiment are similar to those of the first embodiment. The same components are thus denoted by the same reference signs and are not described repeatedly.

Figure 15:
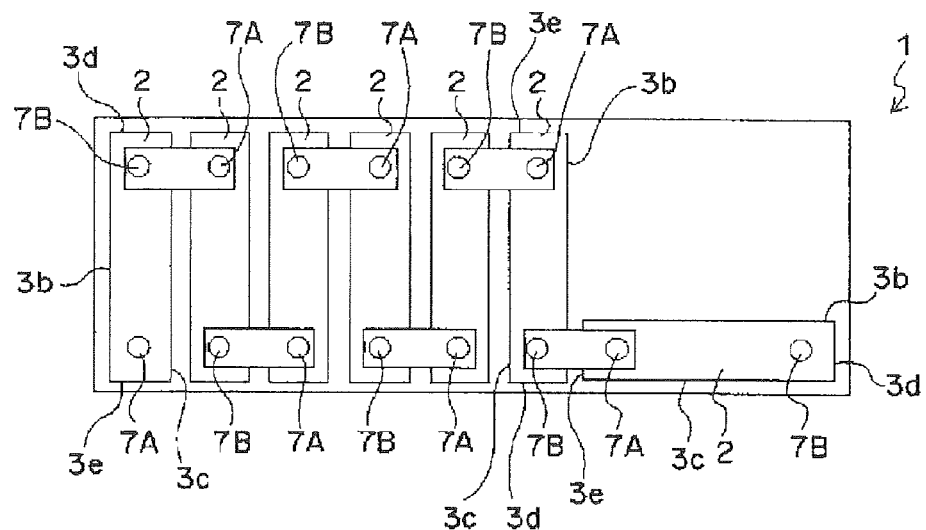
FIG. 15 is a schematic plan view of a battery assembly according to a modification example of the first embodiment.
Figure 16:
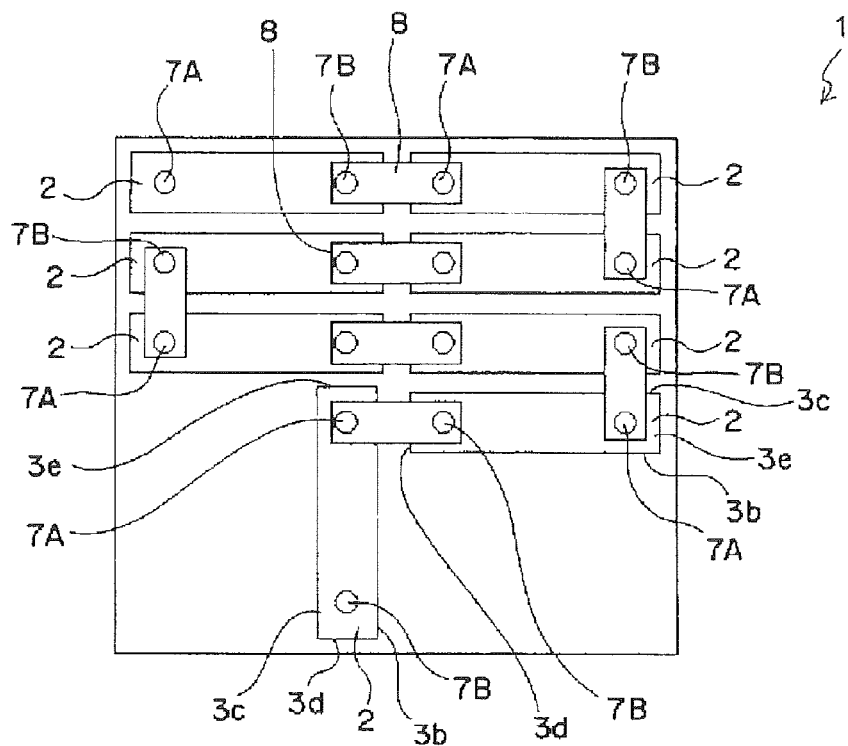
FIG. 16 is a schematic plan view of a battery assembly according to a modification example of the second embodiment.

FIG. 15 shows a modification example of the battery assembly 1 according to the first embodiment, and the arrangement of the two electric cells 2 at the right end in the figure is changed from the parallel arrangement to the cross arrangement. Similarly, FIG. 16 shows a modification example of the battery assembly 1 according to the second embodiment, and the arrangement of the lower two electric cells 2 in the figure is changed from the linear arrangement to the cross arrangement. Such change from the parallel arrangement or the linear arrangement to the cross arrangement can be achieved by setting the positions of the upper through holes 23a of the upper holder 23 and the positions of the lower through holes 24b of the lower holder 24, with no need to change the shapes of the upper cap 21 and the lower cap 22 attached to each of the electric cells 2.

The battery assembly 1 is configured such that the upper holder 23 and the lower holder 24 sandwich and hold the seven electric cells 2 with the upper caps 21 and the lower caps 22 being interposed therebetween. As apparent from the first to third embodiments, the number of the electric cells 2 and the arrangement (parallel arrangement, linear arrangement, or cross arrangement) thereof can be set freely by the positions of the upper through holes 23a and the lower through holes 24b of the upper holder 23 and the lower holder 24, respectively, which are each shaped by pressing a metallic plate and can be prepared relatively at a low cost. Furthermore, even in the case of changing the number of the electric cells 2 or the arrangement thereof, there is no need to change the shapes of the upper caps 21 and the lower caps 22, which requires preparation of new expensive molds for resin molding. In this regard, the battery assembly 1 exerts the high degree of freedom in terms of the arrangement of the electric cells, so that various kinds of small quantity production can be achieved at a low cost.

Each of the upper holder 23 and the lower holder 24 has the integral structure in the present embodiment. Alternatively, the upper holder 23 and the lower holder 24 can be each configured by a plurality of members as long as the upper holder 23 and the lower holder 24 can sandwich and reliably hold the electric cells 2 with the upper caps 21 and the lower caps 22 being interposed therebetween. Similarly, the side parts 25 and 26 can be configured by a plurality of members as long as the side parts 25 and 26 can hold the electric cells 2 that are sandwiched and held by the upper holder 23 and the lower holder 24. The side parts 25 and 26 can be connected to the upper holder 23 and the lower holder 24 with means other than the screws. Furthermore, one or both of the side parts 25 and 26 can be structured integrally with the upper holder 23 or the lower holder 24. In summary, the specific configuration of each of the upper holder 23, the lower holder 24, and the side portions 25 and 26 is not specially limited as long as the electric cells 2 can be securely sandwiched and held with the upper caps 21 and the lower caps 22 being interposed therebetween.

Described below are modification examples of the upper projection 27 with reference to FIGS. 17A to 19. These modification examples are applicable to the lower projection 35.

Figure 17A:
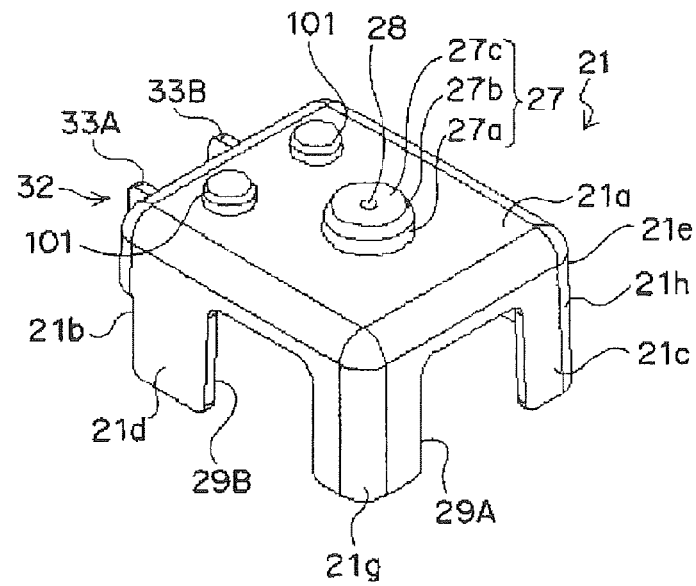
FIG. 17A is a perspective view of upper projections of the upper cap according to a first modification example.

In the modification example shown in FIG. 17A, there are provided, in addition to the upper projection 27 according to the first embodiment, additional upper projections 101 at the top wall 21a of the upper cap 21, near both corners close to the front wall 21b. The upper holder 23 is provided with circular upper through holes to which the upper projections 101 are fitted.

Figure 17B:
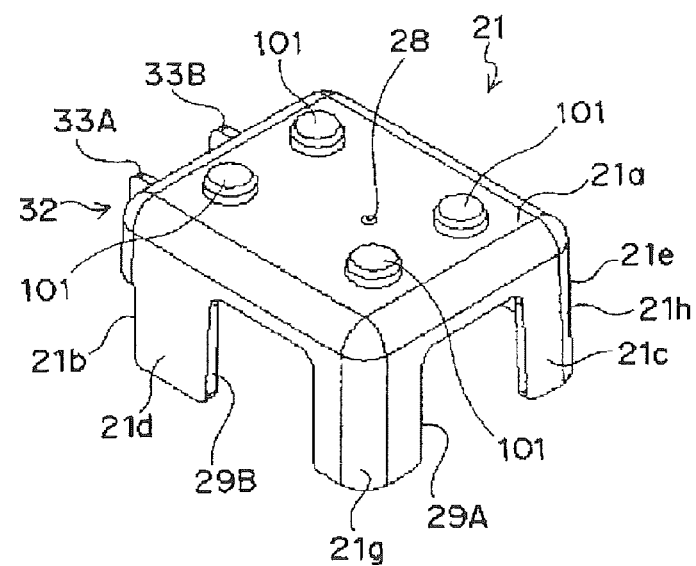
FIG. 17B is a perspective view of upper projections of the upper cap according to a second modification example.

In the modification example shown in FIG. 17B, there are provided, in place of the upper projection 27 according to the first embodiment, upper projections 101 at the top wall 21a of the upper cap 21, near four corners. The inspecting through hole 28 is provided so as to penetrate from the upper surface to the lower surface of the top wall 21a of the upper cap 21. The upper holder 23 is provided with circular upper through holes at the positions corresponding to the four upper projections 101.

As apparent from the modification examples shown in FIGS. 17A and 17B, the number of the upper projections 27 and the positions thereof are not limited to those of the first embodiment.

Figure 17C:
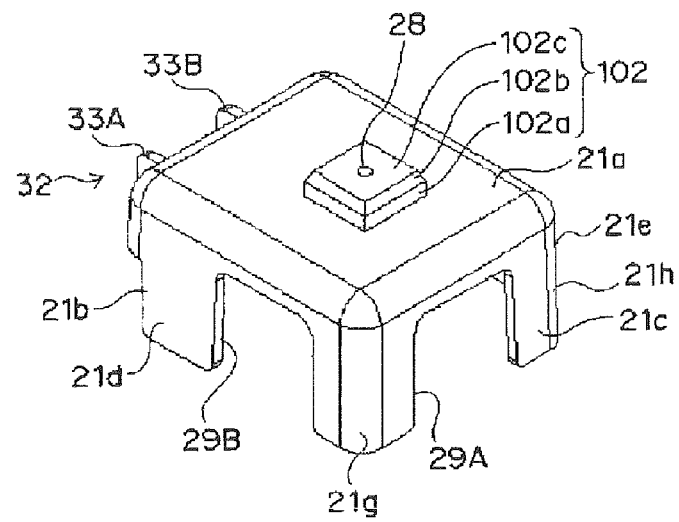
FIG. 17C is a perspective view of an upper projection of the upper cap according to a third modification example.

An upper projection 102 according to the modification example shown in FIG. 17C has a substantially flat prism shape as a whole. More specifically, the upper projection 102 includes a flat prism portion 102a projecting from the upper surface of the top wall 21a of the upper cap 21, a tapered portion 102b formed at the tip of the prism portion 102a and gradually reduced toward the foremost tip, and a substantially flat tip surface 102c. The upper holder 23 is provided with a rectangular upper through hole at the position corresponding to the upper projection 102.

Figure 17D:
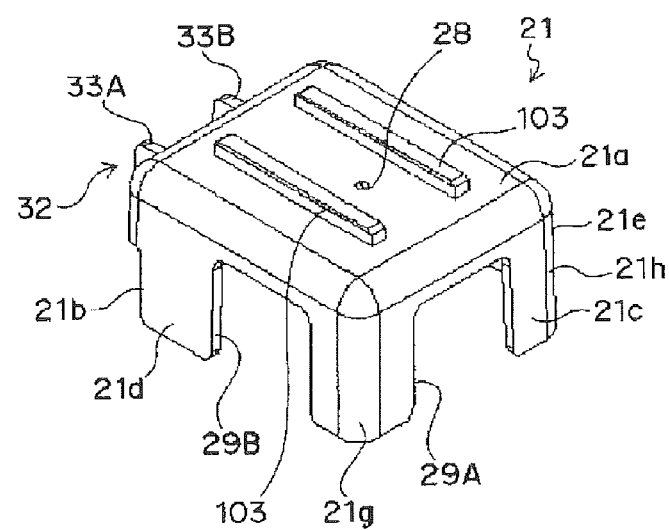
FIG. 17D is a perspective view of upper projections of the upper cap according to a fourth modification example.

In the modification example shown in FIG. 17D, there are provided, in place of the upper projection 27 according to the first embodiment, elongated linear upper projections 103 at the top wall 21a of the upper cap 21, so as to be parallel to the side walls 21d and 21e. In other words, the upper projections 102 in this modification example each have not a protrusion shape but a ridge-like shape. The upper holder 23 is provided with upper through holes in linear groove shapes at the positions corresponding to the upper projections 102 in the ridge shapes.

Figure 17E:
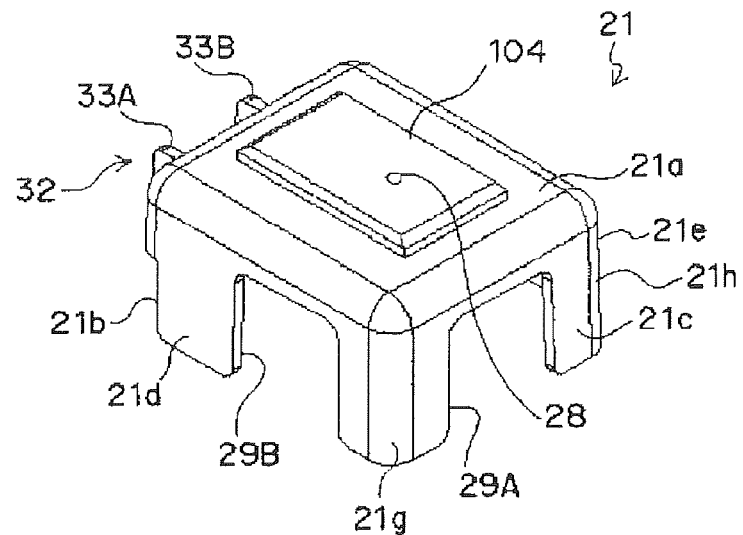
FIG. 17E is a perspective view of an upper projection of the upper cap according to a fifth modification example.

An upper projection 104 according to the modification example shown in FIG. 17E has a flat prism shape similarly to that shown in FIG. 17C, but projects upward from the upper surface of the top wall 21a of the upper cap 21 and has a large area. In other words, the upper projection 104 in this modification example has not a protrusion shape but a bulge-like shape.

Figure 17F:
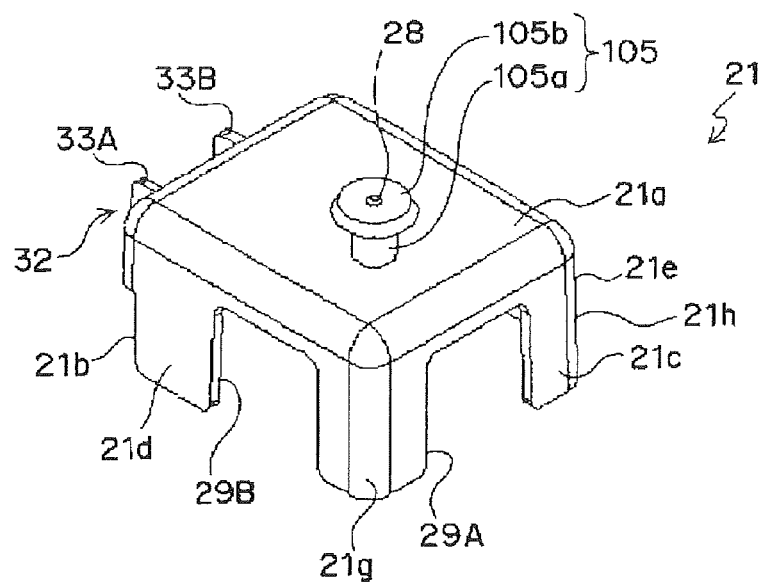
FIG. 17F is a perspective view of an upper projection of the upper cap according to a sixth modification example.

An upper projection 105 according to the modification example shown in FIG. 17F includes a columnar portion 105a projecting from the upper surface of the top wall 21a of the upper cap 21 and relatively small in diameter, and a lock portion 105b formed at the tip of the columnar portion 105 and gradually reduced in diameter from a diameter larger than that of the columnar portion 105a toward the foremost tip. When the upper projection 105 is fitted to the upper through hole provided at the upper holder 23, the lock portion 105b penetrates the upper through hole and the upper holder 23 is sandwiched between the top wall 21 and the lock portion 105b.

As apparent from the modification examples shown in FIGS. 17C to 17F, the shape of the upper projection 27 is not limited to that of the first embodiment.

Figure 18:
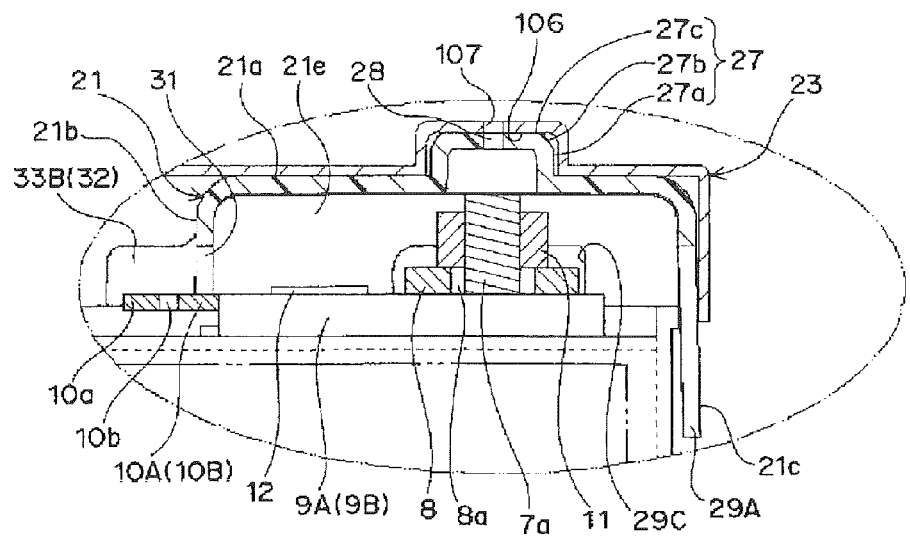
FIG. 18 is an enlarged sectional view according to a modification example in which the upper projection of the upper cap is fitted to a bottomed hole of an upper holder.

In the modification example shown in FIG. 18, the upper holder 23 is provided with a bottomed hole 106 in place of the upper through hole 23a. The upper projection 27 is fitted to the bottomed hole 106. The bottomed hole 106 has a bottom wall that is provided with an inspecting through hole 107 at the position corresponding to the inspecting through hole 28 of the upper cap 21 in a similar manner. A testing electrode or the like can be made in contact with the external terminal 7A or 7B through the inspecting through holes 28 and 107. The upper holder 23 can be provided with a bottomed hole in place of the upper through hole also in the modification examples shown in FIGS. 17A to 17F.

Figure 19:
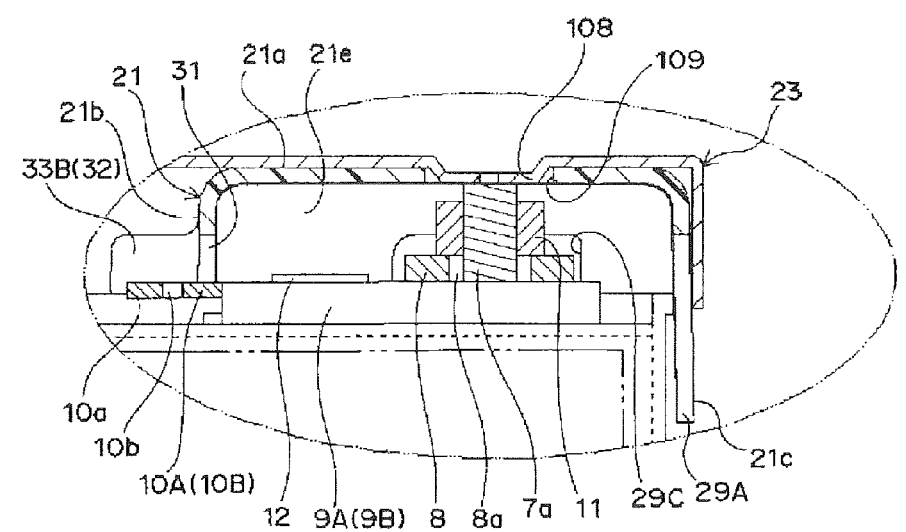
FIG. 19 is an enlarged sectional view according to a modification example in which a projection of the upper holder is fitted to a through hole of the upper cap.

In the modification shown in FIG. 19, the upper holder 23 is provided with an upper projection 108 projecting downward in the figure whereas the upper cap 21 is provided with an upper through hole 109 penetrating the top wall 21a, so that the upper projection 108 is fitted to the upper through hole 109. The upper holder 23 is further provided at the upper projection 108 with an inspecting through hole 110 penetrating in the thickness direction, so that a testing electrode or the like can be made in contact with the external terminal 7A or 7B without detaching the upper cap 21. The configuration in which the upper holder 3 is provided with an upper projection and the upper cap 21 is provided with an upper through hole can be applied to the modification examples shown in Figs. 17A to 17F.

DESCRIPTION OF REFERENCE SIGNS 1 battery assembly
2 electric cell
3 cell container
3a bottom wall
3b,3c long side wall
3d,3e short side wall
4 power generating element
5 cover
7A,7B external terminal
7a shaft
8 bus bar
8a through hole
9A,9B gasket
10A,10B connecting rod
10a inspecting terminal
10b screw hole
11 nut
12 rivet
20 holding structure
21 upper cap
21a top wall
21b front wall
21c rear wall
21d,21e side wall
21f rib structure
21g,21h corner
22 lower cap
22a bottom wall
22b,22c,22d,22e side wall
23 upper holder
23a upper through hole
23b,23c module opening
24 lower holder
24a ventilation opening
24b lower through hole
25,26 side part
27 upper projection
27a columnar portion
27b tapered portion
27c tip surface
28 inspecting through hole
29A,29B,29C bus bar opening
31 terminal opening
32 protector
33A,33B rib
35 lower projection
36A,36B terminal protecting cover
37 monitor
101,102,103,104,105,108 upper projection
106 bottomed hole
109 upper through hole
110 inspecting through hole
L longitudinal direction

The invention claimed is:

1. A battery assembly, comprising:
a plurality of electric cells, each electric cell including a top surface at one end thereof, the top surface including external terminals;
a plurality of first caps attached to the electric cells, respectively; and
a first holder disposed on the first caps,
wherein the external teiminals of said each electric cell comprise positive and negative external terminals,
wherein the positive and negative external terminals of said each electric cell are individually covered by two of the first caps, and
wherein each of the first caps includes a top wall being parallel to and spaced apart from the top surface of said each electric cell.

2. The battery assembly according to claim 1, further comprising:
a plurality of second caps, each second cap being attached to another end located opposite to the one end of said each electric cell; and
a second holder disposed on the second caps,
wherein the plurality of electric cells are sandwiched and held between the first holder and the second holder with the first caps and the second caps being interposed therebetween.

3. The battery assembly according to claim 1, further comprising:
a first engaging portion formed at said each of the first caps; and
a first engaged portion formed at the first holder to be engaged with and disengaged from the first engaging portion.

4. The battery assembly according to claim 3, wherein the first engaging portion comprises a projection and the first engaged portion comprises a recess or a through hole with and from which the projection is engaged and disengaged.

5. The battery assembly according to claim 2, further comprising:

a second engaging portion formed at said each second cap; and a second engaged portion formed at the second holder to be engaged with and disengaged from the second engaging portion.

6. The battery assembly according to claim 5, wherein the second engaging portion comprises a projection and the second engaged portion comprises a recess or a through hole with and from which the projection is engaged and disengaged.

7. The battery assembly according to claim 4, wherein the projection is gradually reduced in sectional area toward a tip thereof.

8. The battery assembly according to claim 3, wherein there are plural sets, each set including the engaging portion formed at the first caps and the engaged portion formed at the first holder.

9. The battery assembly according to claim 3, wherein the electric cell has a substantially rectangular parallelepiped shape and includes the top surface in a rectangular shape having a longitudinal direction and a short-length direction as viewed on a plane, end surfaces extending substantially orthogonally from short sides at both ends of the top surface in the longitudinal direction, and side surfaces extending substantially orthogonally from long sides at both ends of the top surface in the short-length direction, and wherein said each of the first caps includes the top wall in a rectangular shape as viewed on a plane, a first end wall extending from the top wall along one of the end surfaces, a second end wall extending toward the top surface, and first and second side walls extending along the side surfaces.

10. The battery assembly according to claim 9, wherein said each of the first caps is provided with the first engaging portion at the top wall thereof.

11. The battery assembly according to claim 9, wherein the top wall of said each of the first caps is in contact with the first holder.

12. The battery assembly according to claim 3, wherein the first engaging portion of said each of the first caps includes an inspecting through hole.

13. The battery assembly according to claim 5, wherein the electric cell has a substantially rectangular parallelepiped shape and has the top surface in a rectangular shape having a longitudinal direction and a short-length direction as viewed on a plane, end surfaces extending substantially orthogonally from short sides at both ends of the top surface in the longitudinal direction, and side surfaces extending substantially orthogonally from long sides at both ends of the top surface in the short-length direction, wherein said each second cap includes a bottom wall in a rectangular shape as viewed on a plane and side walls extending from four sides of the bottom wall along the end surfaces and the side surfaces of the electric cell, and wherein said each second cap is provided with the engaging portion at the bottom wall thereof.

14. The battery assembly according to claim 13, wherein the bottom wall of said each second cap is in contact with the second holder.

15. The battery assembly according to claim 1, wherein said each first cap further includes an end wall extending from the top wall, and first and second side walls extending from the top wall and being perpendicular to the end wall, and wherein the end wall, the first side wall, and the second side wall include bus bar openings that penetrate the end wall, the first side wall and the second side wall, respectively.

16. The battery assembly according to claim 15, wherein each of the bus bar openings opens to a space defined between the top wall and the top surface.

17. A battery assembly, comprising:

a plurality of electric cells aligned in a predetermined direction, each electric cell including a top surface at one end thereof, the top surface including an external terminal; and a plurality of first caps attached to the electric cells, respectively, wherein each of the first caps includes a top wall having a rectangular shape as viewed on a plane, the top wall being parallel to and spaced apart from the top surface of the electric cell, wherein each of the first caps further includes an end wall extending from the top wall and being parallel to the predetermined direction, and first and second side walls extending from the top wall and being perpendicular to the end wall, and wherein the end wall, the first side wall, and the second side wall include bus bar openings that penetrate the end wall, the first side wall, and the second side wall, respectively.

18. The battery assembly according to claim 17, wherein each of the bus bar openings opens to a space defined between the top wall and the top surface.

19. The battery assembly according to claim 17, further comprising:

a first holder disposed on the first caps;

a plurality of second caps, each second cap being attached to another end located opposite to the one end of said each electric cell; and a second holder disposed on the second caps, wherein the plurality of electric cells are sandwiched and held between the first holder and the second holder with the first caps and the second caps being interposed therebetween.

* * * * *